United States Patent [19]

Rafaeli

[11] Patent Number: 4,516,532
[45] Date of Patent: May 14, 1985

[54] EGG-COLLECTION SYSTEM

[76] Inventor: Gilad Rafaeli, Kibbutz Givat Haim Ichud, Israel

[21] Appl. No.: 572,908

[22] Filed: Jan. 23, 1984

[30] Foreign Application Priority Data

Feb. 4, 1983 [IL] Israel ................................. 67832

[51] Int. Cl.³ ........................................... A01K 31/16
[52] U.S. Cl. ..................................................... 119/48
[58] Field of Search ................................ 119/48, 45 R

[56] References Cited

U.S. PATENT DOCUMENTS 1,686,099 10/1928 Miller ............................. 119/45 R
3,139,065 6/1964 Willaver, Jr. .................. 119/45 R
3,242,904 3/1966 Rannov ............................. 119/48
4,364,332 12/1982 Smith ................................ 119/48
4,381,732 5/1983 Huisinga .......................... 119/48

Primary Examiner—Jay N. Eskovitz

[57] ABSTRACT

An egg-collection system is described for collecting the eggs of laying hens or the like. The system comprises an enclosure defining a plurality of hen laying-stations in side by side relationship, each station including a floor for supporting a hen and formed with a discharge opening therethrough at one end of the respective station. The system further includes a drawer bar drawable over the floors so as to engage any eggs thereon to move them to and through the discharge opening onto a conveyor belt.

16 Claims, 5 Drawing Figures

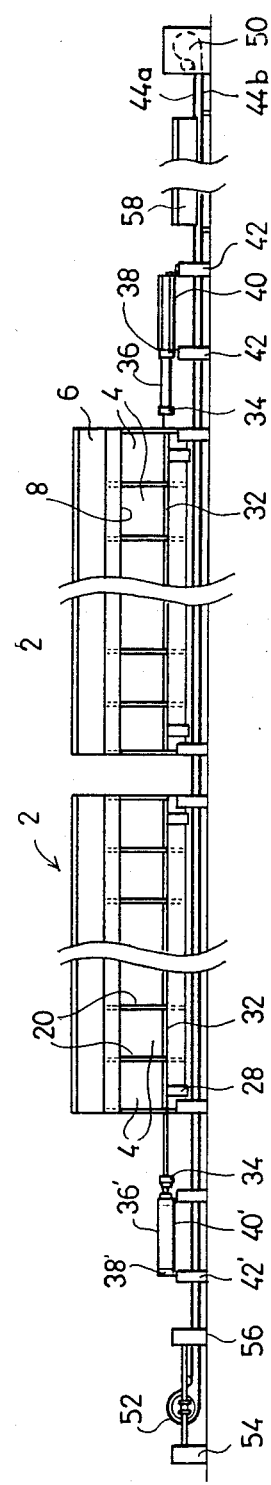
FIG.1
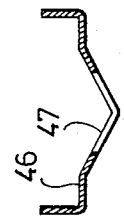
FIG.4
FIG.3

EGG-COLLECTION SYSTEM

BACKGROUND OF THE INVENTION

The present invention relates to egg-collection systems, for collecting eggs of laying hens or the like.

The conventional system for collecting eggs is to remove them from the cages manually, which is a long, unpleasant and time-consuming operation. Systems have been proposed for minimizing the manual operations required in collecting the eggs, but these known systems have not been entirely satisfactory. For example, one known system includes an enclosure formed with an inclined floor such that the eggs move by gravity onto a conveyor belt for collection. However, it has been found that many hens apparently are not comfortable on an inclined floor since they lay their eggs outside of the enclosure, which thereby increases, and not decreases, the manual operations required.

SUMMARY OF THE INVENTION

An object of the present invention is to provide an egg collection system having improvements in the above respects.

According to a broad aspect of the present invention, there is provided an egg collection system for collecting the eggs of laying hens or the like, comprising: an enclosure defining a plurality of hen laying-stations in side-by-side relationship along the length of the enclosure; each of the hen laying-stations including a floor for supporting a hen, which floor is formed with a discharge opening therethrough at one end of the respective station; and a drawer bar drawable over the floors so as to engage any eggs thereon and to move them to the discharge openings to cause them to drop therethrough by gravity.

In the preferred embodiment of the invention described below, the system further includes a conveyor located so as to receive the eggs dropping through the discharge openings and to convey them to a collection station, thereby further minimizing the manual operations required.

In the described preferred embodiment, the conveyor comprises a conveyor belt below the floors in position to receive by gravity the eggs dropping through the discharge openings. More particularly, the conveyor belt is supported on a frame extending underneath the floors for the length of the enclosure, which frame includes a gap underlying each of the discharge openings to permit the conveyor belt to cushion the fall of the eggs through the discharge openings.

Further features and advantages of the invention will be apparent from the description below.

BRIEF DESCRIPTION OF THE DRAWINGS

The invention as herein described, by way of example only, with reference to the accompanying drawings, wherein:

FIG. 1 is a side elevational view illustrating one form of egg collection system constructed in accordance with the present invention;

FIG. 3 is a sectional view along lines III—III of FIG. 2;

FIG. 4 represents a detail; and

DESCRIPTION OF PREFERRED EMBODIMENTS

Figure 2:
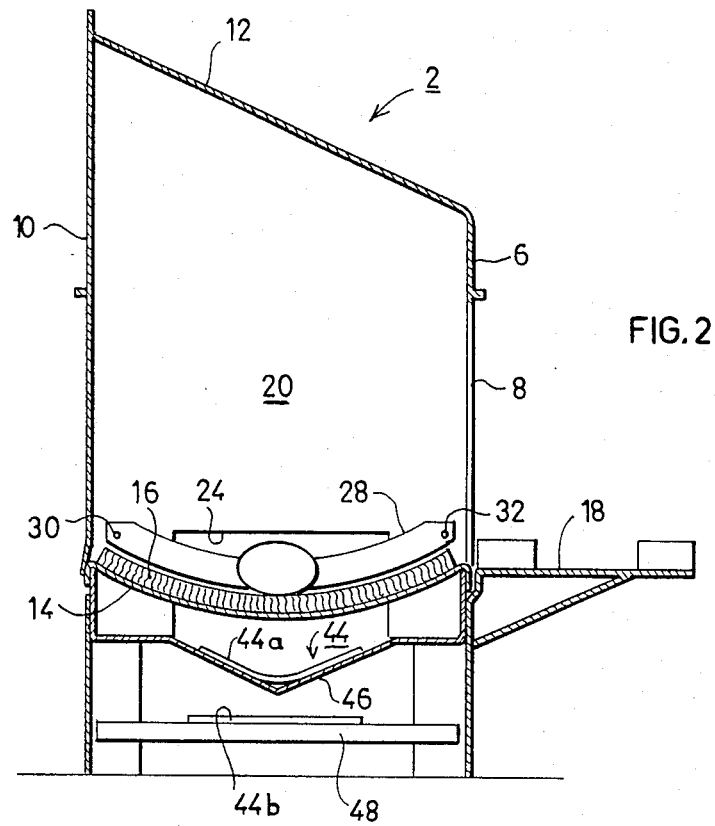
FIG. 2 is an enlarged, end elevational view of the system of FIG. 1, particularly illustrating one of the compartments in the enclosure of that system.

The egg collection system illustrated in FIGS. 1-4 comprises an enclosure, generally designated 2, partitioned into a plurality of hen laying-stations 4 in side-by-side relationship along the length of the enclosure. Thus, enclosure 2 includes a front wall 6 formed with an opening 8 for each of the hen laying-stations 4, a common back wall 10 extending the length of the enclosure 2, and a common top wall 12 extending at an incline also for the complete length of the enclosure.

The system illustrated in FIG. 1 actually includes two enclosures 2 in alignment with each other.

Extending along the complete length of each enclosure 2 is a floor 14 which, as shown in FIG. 2, is concavely-curved in transverse section. Floor 14 is raised above the ground level and is lined on its upper face with artificial grass 16. A horizontal platform or perch 18 is fixed to the front wall 6 of each enclosure 2 and extends for the complete length of the enclosure at the level of the raised floor 14, to facilitate the entry of the hens into the laying stations 4.

The hen laying-stations 4 are in the form of individual compartments separated from each other by vertical partition walls 20 extending between the enclosure front and rear walls 6 and 10, respectively. The raised floor 14 of each enclosure 2 is formed with a plurality of rectangularly-shaped openings 22 equally spaced along the length of the floor as shown particularly in FIG. 3. The partitions 20 are disposed to overlie these openings 22, and the lower end of each partition is formed with a rectangular cut-out 24 (FIG. 2) communicating with these openings. Openings 22, together with the cut-outs 24 of the partitions 20, form egg-discharge openings through which the eggs laid within the respective station or compartment 4 may fall by gravity.

Both enclosures 2 further include a drawer bar 28 for each of the stations or compartments 4 and of a complementary curved shape as the floor 14 of the compartments. All the drawer bars 28 of both enclosures 2 are coupled together by a common transmission including a pair of parallel coupling rods 30, 32 extending for the length of the two enclosures. At one end of the two enclosures 2, the coupling bars 30, 32 are joined by a coupling member 34 to a shaft 36 carrying a piston 38 movable within a cylinder 40 fixed by supports 42 at one side of the two enclosures. The coupling bars 30, 32 are coupled to corresponding elements 34', 36', 38', 40' and 42' at the opposite side of the two enclosures, such that piston 38 may be actuated to reciprocate all the drawer bars 28 in one direction, and the other piston 38' may be actuated to reciprocate all the drawer bars in the opposite direction.

When the drawer bars 28 are reciprocated by pistons 38, 38', they sweep any eggs which have been laid within any compartment 4 to the end of the compartment, where each drops through the discharge opening 22 onto a conveyor belt 44 extending underneath the floors 14 for the complete length of both enclosures 2. Conveyor belt 44 is a closed loop, including an upper run 44a supported on an upper frame 46, and a lower run 44b supported on a lower frame 48. The conveyor belt 44 is driven by a drum 50 having a motor drive at one end of both enclosures; at the opposite end, there is provided an adjustable tensioning wheel 52 mounted between a pair of fixed supports 54, 56 for adjusting the tensioning of the belt.

Preferably, frame 46 supporting the upper run 44a of the conveyor belt 44 is provided with side walls converging at the center, as shown particularly in FIG. 2, to support the upper run 44a of the belt is a substantially concave manner. The supporting frame 46 for the upper run 44a of the conveyor belt 44 extends underneath the floors 14 for the length of the two enclosures 2, but preferably includes an opening 47 (FIG. 4) underlying each of the discharge openings 22 through the floors 14 to permit the conveyor belt to cushion the fall of the eggs when dropping through these discharge openings after being moved thereto by the operation of the drawer bars 28.

The upper run 44a of the conveyor belt 44 thus receives all the eggs after dropping through the discharge openings 22. These eggs are conveyed to a collection station 58 at one side of both enclosures 2, at which collection station the eggs are removed in any suitable manner, e.g., by permitting them to roll downwardly along an incline, so that the return run 44b of the belt is empty of eggs.

The operation of the egg-collection system illustrated in FIGS. 1-4 will be apparent from the above description. Thus, as the hens enter the egg-laying stations or compartments 4, they are substantially isolated from each other so as not to be disturbed during the laying of the eggs. Periodically, the drawer bars 28 are reciprocated in one direction, and then in the opposite direction, by the operation of pistons 38 and 38'. During the reciprocation of the drawer bars 28, they sweep any eggs in their respective compartments to the discharge openings 22 formed at the ends of the compartments, whereupon the eggs drop by gravity onto the upper run 44a of the conveyor belt 44, the fall being cushioned by opening 47 (FIG. 4) formed in the supporting frame 46 underlying the egg-discharge openings 22. Conveyor 44 may be continuously or periodically operated to convey the eggs thereon to the collection station 58, where the eggs are removed before the belt is returned through its return run 44b.

Figure 5:
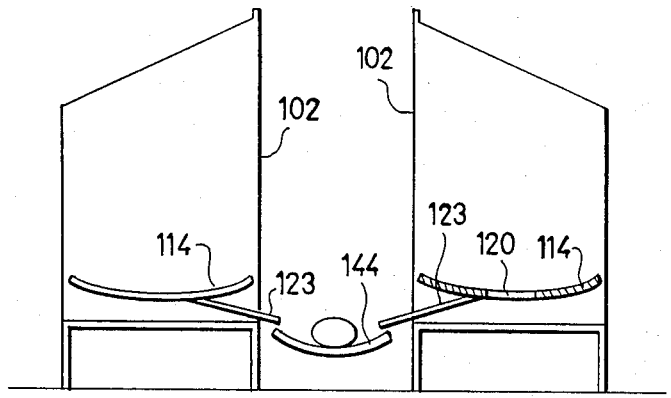
FIG. 5 illustrates another egg collection system constructed in accordance with the present invention.

FIG. 5 illustrates a variation, wherein the conveyor belt, therein designated 144, is disposed laterally of the enclosure, rather than underneath the enclosure as in FIGS. 1-4. FIG. 5 also includes two enclosures 102 but here they are disposed in parallel spaced relationship, with the conveyor belt 144 being common to both and disposed between them. In this case, the floors 114 of the enclosures are also curved as shown in FIG. 5, and include discharge openings 120 at the ends of the hen laying-stations or compartments, but an inclined plank 123 is provided from each discharge opening 120 to direct the eggs to the conveyor belt 144.

While the invention has been described with respect to two preferred embodiments, it will be appreciated that many other variations, modifications and applications may be made.

What is claimed is:

1. An egg-collection system for collecting the eggs of laying hens or the like, comprising: an enclosure defining a plurality of hen laying-stations in side-by-side relationship along the length of the enclosure; each of said hen laying-stations including a floor for supporting a hen, which floor is formed with a discharge opening therethrough at one end of the respective station; and a drawer bar means drawable over said floors so as to engage any eggs thereon and to move them to said discharge openings to cause them to drop therethrough by gravity.

2. The system according to claim 1, further including a conveyor located so as to receive the eggs dropping through said discharge openings and to convey them to a collection station.

3. The system according to claim 2, wherein said conveyor comprises a conveyor belt below said floors in position to receive by gravity said eggs dropping through said discharge openings.

4. The system according to claim 3, wherein said conveyor belt is supported on a frame extending underneath said floors for the length of said enclosure, which frame includes a gap underlying each of said discharge openings to permit the conveyor belt to cushion the fall of the eggs through the discharge openings.

5. The system according to claim 3,
wherein said conYeyor belt is a closed loop belt having an upper run underlying said floors of the enclosure and the discharge openings therethrough, and a lower run underlying said upper run.

6. The system according to claim 5, wherein said conveyor further includes a drive wheel engaging said belt at one end of the enclosure, and a tension wheel engaging said belt at the opposite end of the enclosure for tensioning the belt.

7. The system according to claim 1,
wherein said closure is divided into a plurality of individual compartments separated from each other by partition walls.

8. The system according to claim 7, wherein said partition walls overlie said egg-discharge openings formed through said floors, said partition walls also being formed with openings at their lower ends communicating with said discharge openings through the floors.

9. The system according to claim 1,
wherein said enclosure includes a common floor for all the hen laying-stations, which common floor is lined with artificial grass.

10. The system according to claim 1,
wherein said floors are concavely curved in transverse section.

11. The system according to claim 10, wherein said drawer bar is of complementary curved shape as said floors.

12. The system according to claim 1,
wherein said drawer bar means includes a separate drawer bar for each of said hen laying-stations and extending transversely across said floor, all said drawer bars being coupled to a common transmission which is periodically reciprocated first in one direction, and then in the opposite direction.

13. The system according to claim 12, wherein said common transmission includes a pair of parallel coupling rods extending longitudinally through said enclosure and coupled to the opposite ends of all said drawer bars.

14. The system according to claim 12,
wherein said common transmission is periodically reciprocated by a piston coupled to each end of the transmission movable within a cylinder at the respective end of the transmission.

15. The system according to claim 3, wherein said conveyor belt is disposed laterally of said enclosure and includes an inclined plank from each discharge opening to direct the eggs thereto.

16. The system according to claim 15, wherein there are two of said enclosures in parallel spaced relationship, said conveyor belt being common to both of said enclosures and disposed between them.

* * * * *

UNITED STATES PATENT AND TRADEMARK OFFICE
CERTIFICATE OF CORRECTION

PATENT NO. : 4,516,532
DATED : May 14, 1985
INVENTOR(S) : Rafaeli Gilad

It is certified that error appears in the above-identified patent and that said Letters Patent is hereby corrected as shown below:

On the title page Insert

--(73)Assignee: M.G.H. Automation Systems, Givat Haim Ihud, Israel --.

Signed and Sealed this

Fourteenth Day of February, 1989

Attest:

DONALD J. QUIGG

*Attesting Officer*      *Commissioner of Patents and Trademarks*